United States Patent
Epple

(10) Patent No.: US 8,727,365 B2
(45) Date of Patent: May 20, 2014

(54) TRACTOR STEERING BRAKING SYSTEM

(75) Inventor: Johann Epple, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 365 days.

(21) Appl. No.: 13/139,228

(22) PCT Filed: Dec. 10, 2009

(86) PCT No.: PCT/EP2009/066880
§ 371 (c)(1),
(2), (4) Date: Aug. 10, 2011

(87) PCT Pub. No.: WO2010/066864
PCT Pub. Date: Jun. 17, 2010

(65) Prior Publication Data
US 2011/0291471 A1 Dec. 1, 2011

(30) Foreign Application Priority Data
Dec. 12, 2008 (GB) .................................. 0822678.9

(51) Int. Cl.
*B60T 11/21* (2006.01)

(52) U.S. Cl.
USPC .......... 280/264; 180/244; 280/265; 74/478.5; 303/9.61

(58) Field of Classification Search
CPC ................................ B60T 11/21; B62D 11/08
USPC .......... 180/244; 280/264, 265; 74/560, 594.1, 74/594.4, 478, 478.5, 512
See application file for complete search history.

(56) References Cited

U.S. PATENT DOCUMENTS

| | | | | |
|---|---|---|---|---|
| 3,181,388 A | * | 5/1965 | Riddy | 74/478 |
| 3,935,932 A | * | 2/1976 | Moorhouse | 192/13 R |
| 4,282,509 A | * | 8/1981 | Newman | 340/479 |
| 4,299,136 A | * | 11/1981 | Turi et al. | 74/478.5 |
| 4,462,271 A | * | 7/1984 | Stieg | 475/86 |
| 4,479,563 A | * | 10/1984 | Horsch | 180/6.7 |
| 4,878,559 A | | 11/1989 | Seaton et al. | |
| 5,488,817 A | | 2/1996 | Paquet et al. | |

(Continued)

FOREIGN PATENT DOCUMENTS

| | | |
|---|---|---|
| DE | 4025157 A1 | 2/1992 |
| FR | 2927595 A | 8/2009 |

OTHER PUBLICATIONS

International Search Report for PCT/EP2009/066880 dated Mar. 25, 2010.
UK Search Report for GB0822678.9 dated Apr. 14, 2009.

*Primary Examiner* — Thomas Irvin

(57) ABSTRACT

A tractor braking system (10) having independent brake circuits (L,R) for each of a left and a right wheel is provided. Each circuit is activated by a respective brake pedal (16,17). The system comprises a releasable locking mechanism (25) to lock the two pedals together and sensors (50) to detect depression of the respective pedals (16,17). In response to a detection of only one pedal being depressed, warning means are provided to indicate to a driver that the pedals are in an unlocked state. A sensing of simultaneous depression of the pedals may be used to indicate that the pedals are in a locked state.

13 Claims, 4 Drawing Sheets

(56) References Cited

U.S. PATENT DOCUMENTS

| | | | |
|---|---|---|---|
| 5,842,364 A | * | 12/1998 | Oliver .............................. 70/202 |
| 6,531,667 B2 | * | 3/2003 | Becker et al. ................. 200/86.5 |
| 7,712,845 B2 | | 5/2010 | Mackovjak et al. |
| 2006/0097569 A1 | * | 5/2006 | Eberling et al. ......... 303/122.15 |
| 2008/0229868 A1 | * | 9/2008 | Populaire ........................ 74/512 |
| 2011/0056327 A1 | * | 3/2011 | Mazzucchi et al. ............. 74/512 |
| 2011/0066328 A1 | | 3/2011 | Maurizio et al. |
| 2013/0038118 A1 | * | 2/2013 | Brinkley et al. ............. 303/9.62 |

\* cited by examiner

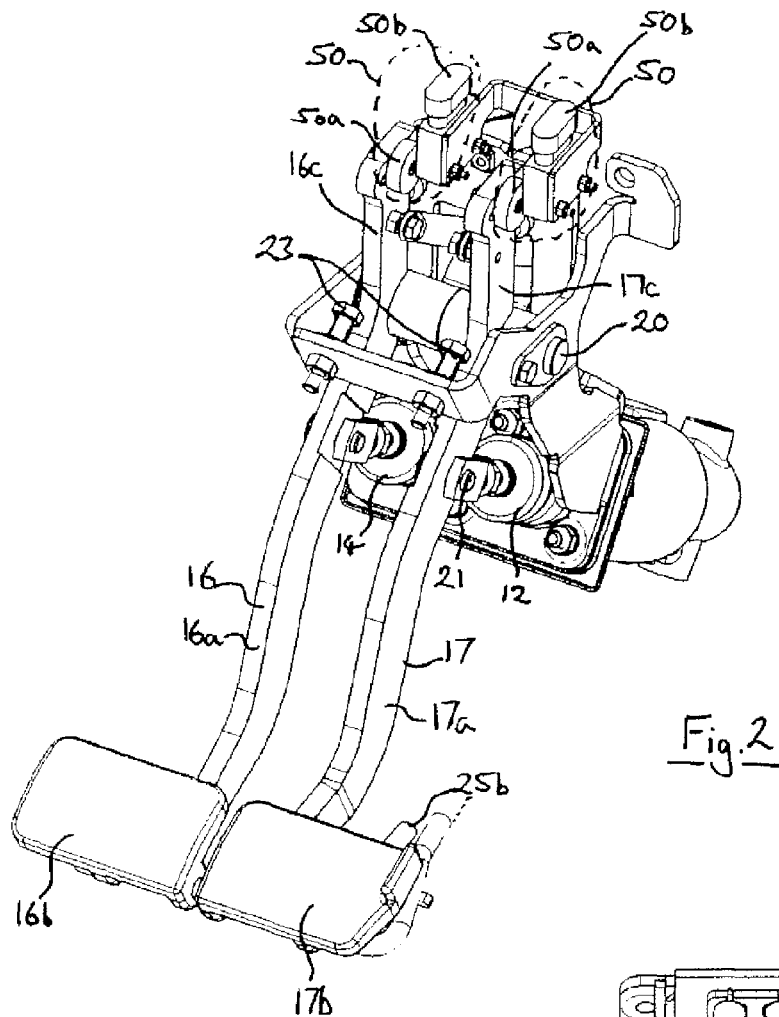
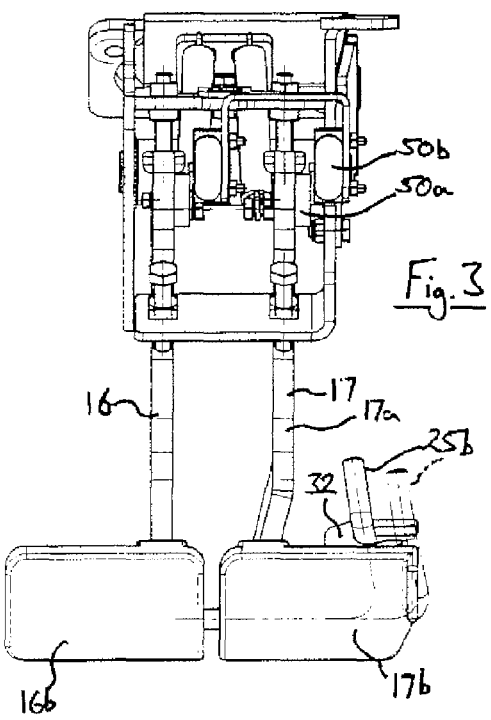

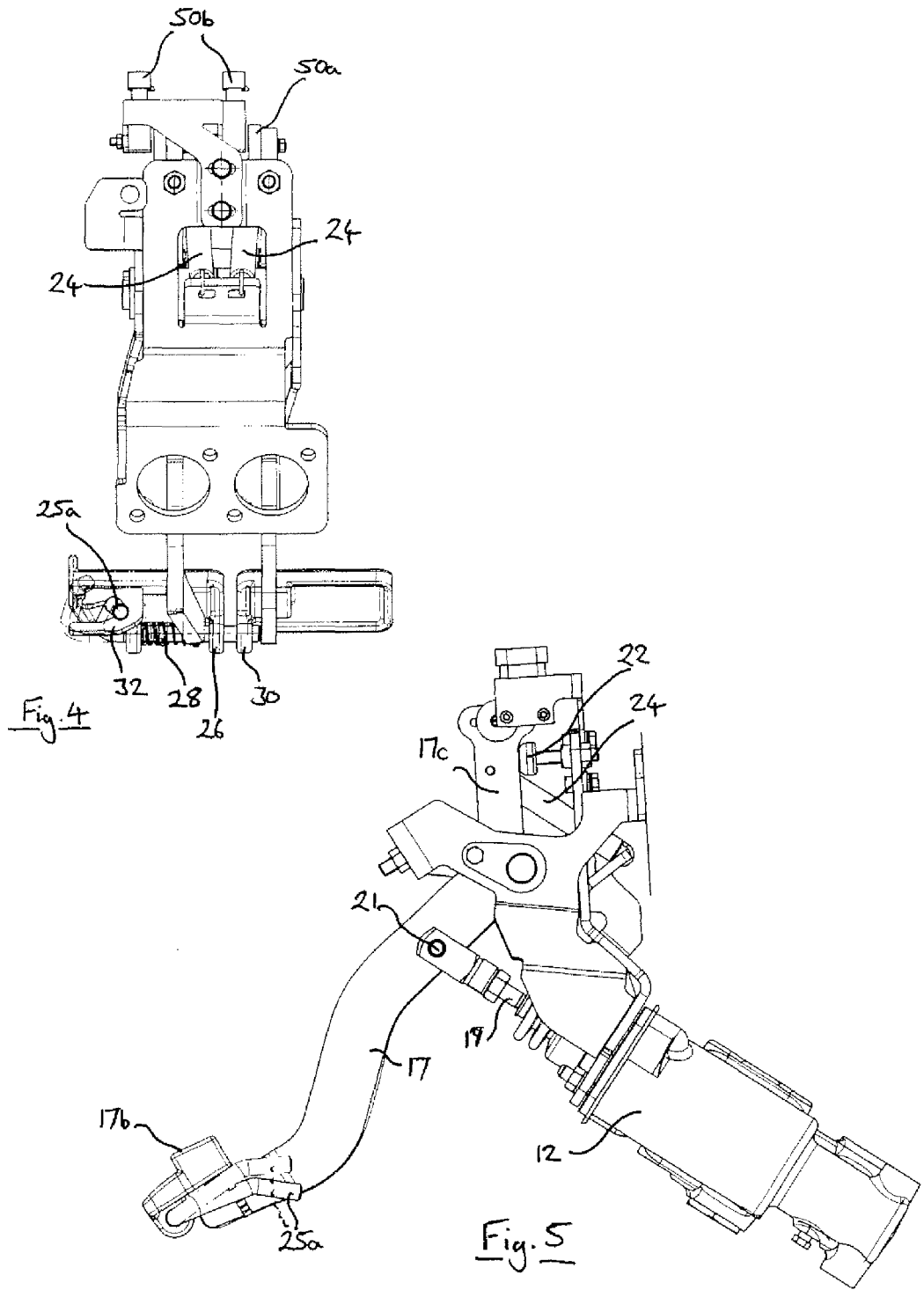

TRACTOR STEERING BRAKING SYSTEM

The invention relates to a braking system fitted to an agricultural tractor which has independent brake circuits for each of a left and a right wheel wherein each circuit is activated by a respective pedal and wherein the pedals can be locked together by a releasable locking mechanism.

To assist in the steering of tractors on slippery surfaces such as mud independent brake circuits for the left and right rear wheels are traditionally provided to allow the driver to brake only the inside wheel of a turn. It is known to provide a locking mechanism fitted to the pedal assembly which, during normal use, locks the two pedals together. This avoids the risk of single wheel braking at high speeds, for example on the highway, which could result in an undesired swerving of the vehicle.

During field work in which the steering brake function is required, the driver can simply release the locking mechanism to allow independent actuation of the pedals. However the risks associated with unintended single wheel braking whilst on the highway are significant and this can be a result of the driver simply forgetting to re-engage the locking mechanism when leaving the field.

Therefore it is an object of the invention to provide a steering brake system which alleviates the above mentioned risks.

According to the present invention there is provided a tractor braking system having independent brake circuits for each of a left and a right wheel, each circuit being activated by a respective pedal, the system comprising a releasable locking mechanism to lock the two pedals together, sensors to detect depression of the respective pedals, and, in response to a detection of only one pedal being depressed, warning means to indicate to a driver that the pedals are in an unlocked state. Therefore, the detection of a single-pedal depression results in a logical decision that the two pedals are unlocked with respect to one another. This is exploited to provide a warning to the driver.

Advantageously, in some cases, this will not require additional hardware to be fitted to the tractor because such pedal sensors are provided for known systems. For example, the hardware may exist in a system wherein a differential lock mechanism is disengaged automatically when depression of only one pedal is sensed.

Preferably, the system further comprises a memory for storing a status of the locking mechanism and the warning means is activated when the stored status is 'unlocked'. Furthermore, the stored status of the locking mechanism may be set to 'locked' in response to a detection of both pedals being depressed and set to 'unlocked' in response to a detection of only one pedal being depressed.

In a preferred embodiment the releasable locking mechanism comprises a locking pin slidably mounted to one pedal and biasing means to bias the pin into an engagement with a receiving slot disposed on the other pedal, and wherein the locking pin can be latched in a withdrawn position to allow individual braking of the respective wheels.

The warning means may comprise a visual indicator such as a light disposed on a dashboard or an audible warning such as a periodic bleeper.

The locking mechanism may take the traditional form of being manually engageable and/or releasable. However it is envisaged that the locking mechanism may be engageable and/or releasable by an electrically activated solenoid located on the pedal assembly. This enables automatic activation of the locking mechanism by the system. For example, the locking mechanism may be automatically released when the speed of the tractor falls below a predetermined value. Such a mode may be selectable by the driver.

Preferably the speed of the tractor is limited to a predetermined value when the two pedals are sensed as unlocked. Advantageously this provides an additional level of safety which physically prevents the tractor exceeding a predetermined speed when the pedals are unlocked thus avoiding the risk of hazardous swerving on the highway caused by single wheel braking.

The presence of the pedal sensors can be exploited together with a locking mechanism which is engageable and/or releasable by an electrically activated solenoid as described above. In this case the locking mechanism may be automatically engaged when the speed of the tractor exceeds a predetermined value and depression of neither pedal is sensed. Advantageously this provides an additional level of safety in which the two pedals are locked together automatically at high speeds which is when the greatest risk occurs, typically on the highway.

Further advantages of the invention will become apparent from the following description of a specific embodiment with reference to the appended drawings in which:—

FIG. 2 is a perspective view of a pedal assembly which forms part of the system of FIG. 1;

FIG. 3 is a plan view of the pedal assembly of FIG. 2;

FIG. 4 is a rear view of the pedal assembly of FIG. 2;

FIG. 5 is a side view of the pedal assembly of FIG. 2;

Figure 1:
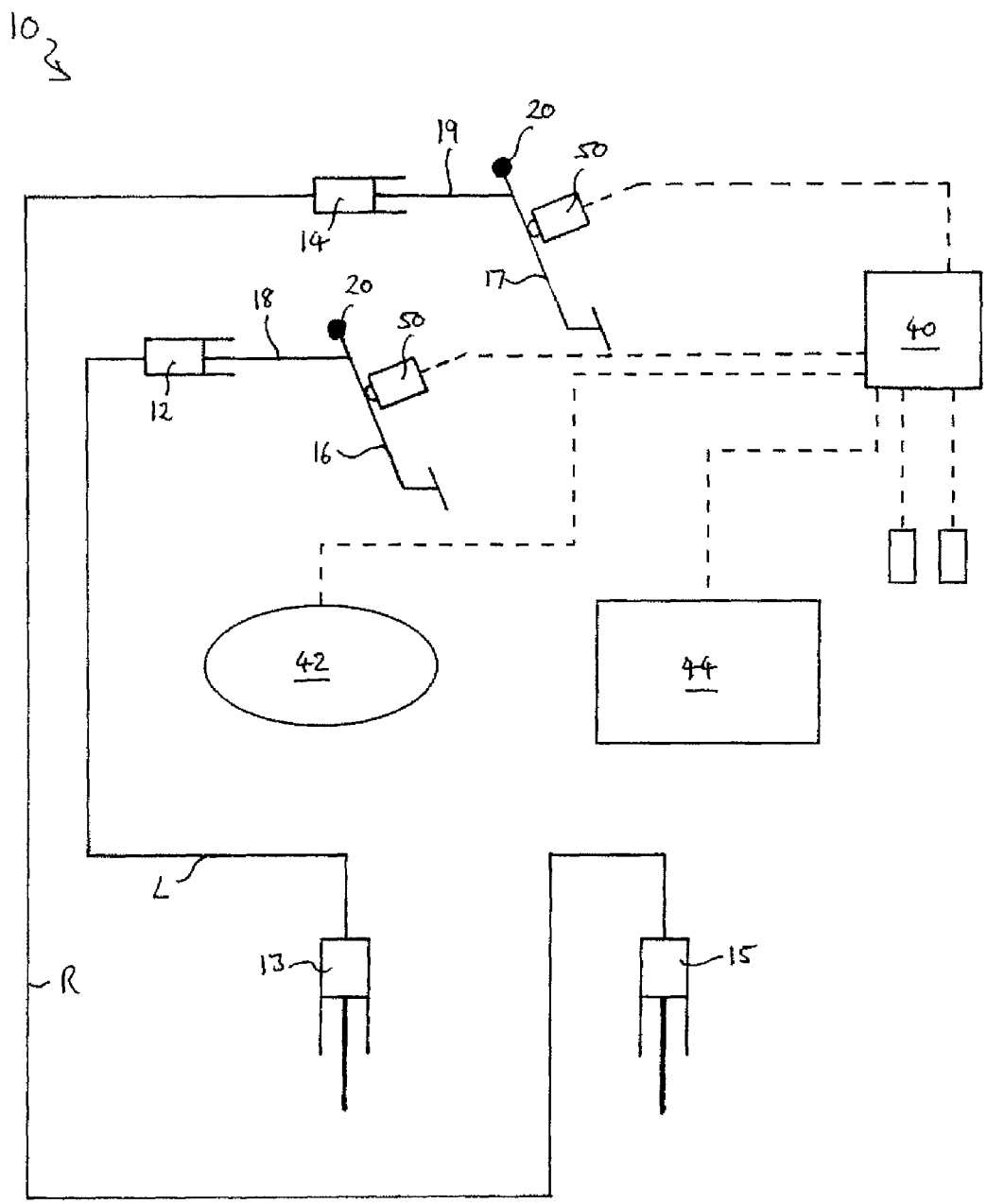
FIG. 1 is a schematic view of a tractor braking system in accordance with the invention.

With reference to FIG. 1, a braking system 10 is fitted to an agricultural tractor (not shown). The tractor is of a known construction and typically comprises a pair of rear wheels and a pair of front steerable wheels. The tractor may have four-wheel drive transmission or two-wheel drive transmission. The specific detail relating to the tractor components away from the braking system will not be described any further. However it will be appreciated that, as is common in such vehicles, the tractor can operate in various working conditions including low speed activities in the field sometimes with low adhesion and high speed operation on highways.

The system 10 comprises a left hand brake circuit L associated with the rear left wheel (not shown) and a right hand brake circuit R associated with the rear right wheel. The left hand brake circuit L comprises a master cylinder 12 and a slave cylinder 13. Similarly, the right hand brake circuit R comprises a master cylinder 14 and slave cylinder 15. As in known tractor braking systems, each slave cylinder 13,15 is connected to respective brake gear for braking the associated wheel. Fluid pressure created by the associated master cylinder is transmitted via the respective circuit to the slave cylinder which applies a braking force to the brake gear in a known manner.

Each master cylinder 12,14 of the respective brake circuits is connected to a respective pedal 16,17 via a connecting rod 18,19 as can be seen also in FIG. 5.

By way of example, right hand pedal 17 comprises a lever portion 17a which pivots around shaft 20 which is shared with left hand pedal 16. Right hand pedal 17 further comprises a foot pad 17b fixed to the lower end of lever 17a as shown best in FIGS. 2 to 6. Connecting rod 19 is pivotally coupled to the upper end of lever 17a by a bolt 21. Therefore a force applied to foot pad 17b by a driver's right foot (not shown) depresses the pedal 17 thus actuating master cylinder 12 and, in turn, slave cylinder 13.

It will be appreciated that left hand pedal 16 is of essentially the same construction as right hand pedal 17 bar the locking mechanism described below.

Each pedal 16,17 comprises an extension portion 16c,17c respectively which each contact with respective upper stops 22 and lower stops 23 which serve to limit the range of movement of each pedal.

The fluid pressure in the circuits L, R and retaining springs 24 return the pedal to the normal position as in known braking systems.

Figure 6A:
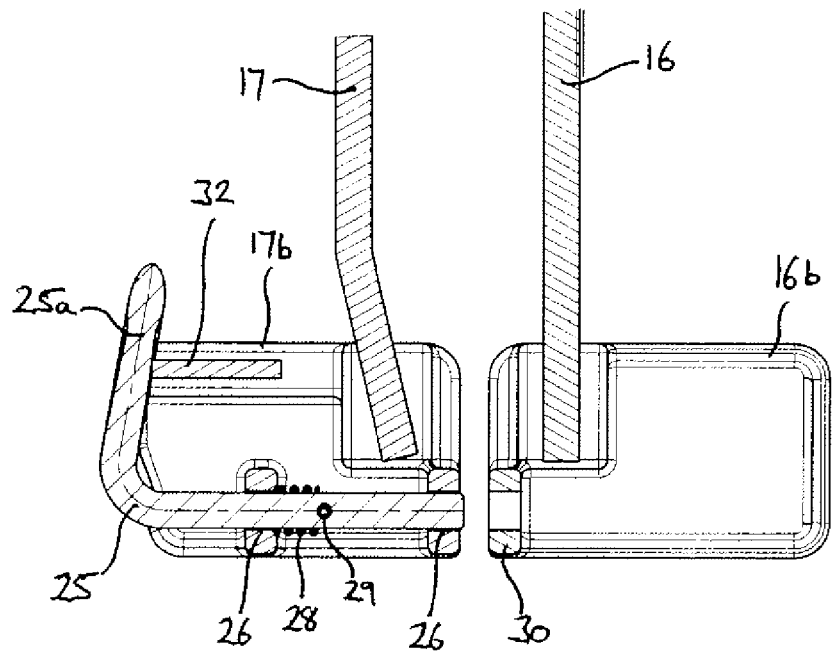
FIG. 6a is a rear view of part of the pedal assembly of FIG. 2 showing the releasable locking mechanism in the disengaged position.
Figure 6B:
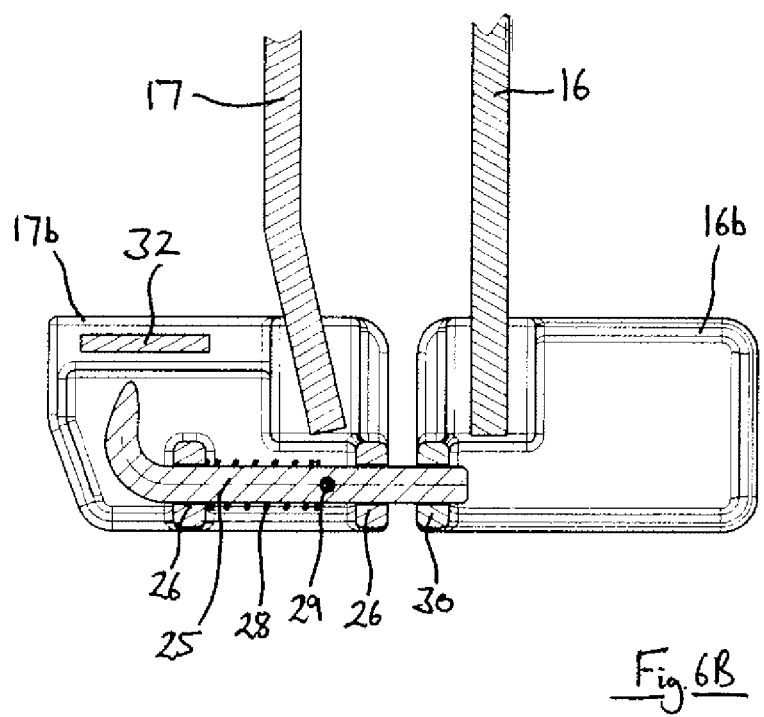
FIG. 6b shows the releasable locking mechanism in the engaged position.

As best seen in FIGS. 6a and 6b a releasable locking mechanism comprises a locking pin 25 which is slidably mounted to the underside of right hand foot pad 17b. The pin 25 is slidably mounted in two guiding slots 26 to allow transverse movement of the pin. A coil spring 28 surrounds the pin 25 in a region enclosed between one of the guiding slots 26 and a stop 29 fitted to the pin 25. The spring 28 biases the pin 25 into an engagement with a receiving slot 30 disposed on the edge of left hand foot pad 16b. When engaged the pin 25 locks the right hand pedal 17 to left hand pedal 16 so as to ensure simultaneous actuation of the left hand and right hand brakes.

The pin 25 can be latched in a withdrawn position wherein an extension 25a of pin 25 is held against a stop 32 disposed on the right hand foot pad 17b by the force of compressed spring 28.

A driver can simply provide a steering brake function by withdrawing pin 25 from the receiving slot 30 (FIG. 6b) and engage extension 25a against stop 32 (FIG. 6a).

The embodiment shown in FIGS. 2 to 6 includes a manually engageable and releasable locking pin 25. However it is envisaged that the locking mechanism may be automated by fitting an electrically activated solenoid (not shown) to the pedal assembly. In this case an extension 25a would not be required and the solenoid would either provide a two-way force to operate the locking pin 25 or a one-way force in combination with a coil spring to allow the locking pin 25 to be engaged and released. Alternatively further still an automatic locking mechanism may be provided by the inclusion of a hydraulic or pneumatic cylinder as shown schematically in FIG. 1. Such alternatives can employ known components and can be fitted to the pedal assembly and locking mechanism using common engineering techniques.

The system further comprises sensors 50 to detect depression of the respective pedals 16,17. Each sensor 50 comprises a solenoid 50a affixed to one side of each pedal extension portion 16c, 17c respectively, and a solenoid switch 50b mounted so as to detect presence of the respective solenoid when in the fully raised position. Furthermore, each sensor 50 is in communication with ECU 40.

The ECU 40 comprises a memory for storing a status of the locking mechanism. The status can be locked or unlocked. In the event of sensors 50 detecting the depression of only one pedal, the stored status is set to unlocked and an indicator light disposed on a dash board 42 is illuminated. This provides a visual warning to the driver that the brake pedals 16,17 are not locked together. Alternatively, or in addition, audible warning means may be provided to highlight the unlocked status of the brake pedals to the driver.

The stored status of the locking mechanism is set to locked in response to a detection of both pedals being depressed.

When the system is in the unlocked status, tractor ECU 40 limits the speed of the tractor to a value which may be determined by factory settings. In this case the driver must engage the locking pin 25 to obtain greater speeds. This ensures the respective brake circuits L,R cannot be operated individually when the tractor is being driven at high speed on the highway for example.

In the case of an automatic means to engage and/or disengage the locking pin 25, a switch (not shown) may be provided on a user interface 44, such as driver's console, which is in communication with tractor ECU 40. Such a switch allows the driver to engage and/or disengage the locking mechanism without physically stretching to any significant extent.

With reference to FIG. 1, the system 10 further comprises a speed sensor 46 and a steering angle sensor 48 each in communication with the ECU 40. In the event that the driver wishes to disengage the locking pin 25 remotely by the switch on user interface 44, the tractor ECU 40 firstly determines whether the speed sensed by sensor 46 is below a predetermined value. In the event that the sensed speed is above the predetermined value the disengagement of the locking pin 25 is blocked by the ECU 40. Only when the sensed speed drops below the predetermined value does the ECU 40 command a disengagement of the locking pin 25.

The tractor comprises a differential lock mechanism which serves to selectively lock the differential between the drive transmission for the left and right rear wheels respectively. As in known tractor control systems, depression of the respective brake pedals is sensed to allow automatic disengagement of the differential lock upon depression of only one pedal. Sensors 50 can be exploited in accordance with the invention as described below.

In an embodiment not shown an automatic locking mechanism can engage locking pin 25 when commanded by tractor ECU 40. In order to determine that both right hand and left hand pedals 16,17 are in a lifted position the sensed status by sensors 50 can be exploited. Therefore in the event of the ECU 40 commanding engagement of locking pin 25 a prerequisite that both pedals 16,17 are lifted and the speed of the tractor is below a predetermined value is followed.

In one example the locking pin 25 may be automatically engaged when the speed of the tractor, or the requested speed, exceeds a predetermined value.

Although the releasable locking mechanism as described above comprises a slideable locking pin it is envisaged that this may be replaced by other suitable locking means which may be fitted to any part of the pedal assembly without deviating from the scope of the invention.

The means provided in the above embodiment to warn the driver that the pedals are unlocked is an illuminated light on the dash board 42. However it is envisaged that this may be replaced by various visual or audible warning means such as a green light when the pedals are locked for example.

It is envisaged that the invention is applicable to a tractor which comprises a brake circuit associated with each of more than two wheels. In such case it is preferable that the brake circuits associated with the front steerable wheels are disabled when the steering brake function is provided (that is when both pedals are unlocked).

The locking mechanisms described include manual and automatic mechanisms which allow actuation by a driver's hand, either manually or remotely, or entirely automatically. It is reiterated that hybrid versions of manual, remote and automatic actuation are envisaged. For example, an electrical solenoid may be employed to lock the two pedals together automatically in response to sensed parameters whereas a manual action by the driver is required to withdraw the locking pin 25.

In summary, there is provided a tractor braking system having independent brake circuits for each of a left and a right wheel. Each circuit is activated by a respective brake pedal. The system comprises a releasable locking mechanism to lock the two pedals together and sensors to detect depression of the respective pedals. In response to a detection of only one pedal being depressed, warning means are provided to indicate to a driver that the pedals are in an unlocked state. A sensing of simultaneous depression of the pedals may be used to indicate that the pedals are in a locked state. Advantageously, this delivers a cheap and simple route to providing a warning to the driver that the brake pedals are unlocked, even requiring no additional hardware in some cases.

From reading the present disclosure, other modification will be apparent to persons skilled in the art. Such modifications may involve other features which are already known in the field of tractor braking systems and component parts therefore and which may be used instead of or in addition to features already described herein.

The invention claimed is:

1. A tractor braking system having independent brake circuits for each of a left and a right wheel, each circuit being activated by a respective pedal, the system comprising a releasable locking mechanism to lock the two pedals together, sensors to detect depression of the respective pedals, and, in response to a detection of only one pedal being depressed, warning means to indicate to a driver that the pedals are in an unlocked state.

2. A system according to claim 1, further comprising a memory for storing a status of the locking mechanism and the warning means is activated when the stored status is 'unlocked'.

3. A system according to claim 2, wherein the stored status of the locking mechanism is set to 'locked' in response to a detection of both pedals being depressed and set to 'unlocked' in response to a detection of only one pedal being depressed.

4. A system according to claim 1, wherein the releasable locking mechanism comprises a locking pin slidably mounted to one pedal and biasing means to bias a spring into an engagement with a receiving slot disposed on the other pedal, and wherein the locking pin can be latched in a withdrawn position to allow individual braking of the respective wheels.

5. A system according to claim 1, wherein the warning means comprises a visual indicator.

6. A system according to claim 5, wherein the visual indicator is a light disposed on a dashboard.

7. A system according to claim 1, wherein the warning means comprises an audible warning.

8. A system according to claim 1, wherein the locking mechanism is manually engageable and/or releasable.

9. A system according to claim 1, wherein the locking mechanism is engageable and/or releasable by an electrically activated solenoid.

10. A system according to claim 9, wherein the locking mechanism is automatically released when the speed of the tractor falls below a predetermined value.

11. A system according to claim 1, wherein the speed of the tractor is limited to a predetermined value when the two pedals are sensed as unlocked.

12. A system according to claim 1, wherein a differential lock mechanism is disengaged when depression of only one pedal is sensed.

13. A system according to claim 12 wherein the locking mechanism is engageable and/or releasable and, wherein the locking mechanism is automatically engaged when the speed of the tractor exceeds a predetermined value and depression of neither pedal is sensed.

* * * * *